Patented June 18, 1935

2,004,932

UNITED STATES PATENT OFFICE 2,004,932

PRODUCTION OF FLUORINE COMPOUNDS

Herbert Wilkens Daudt, Mortimer Alexander Youker, and Harold La Belle Jones, Wilmington, Del., assignors, by mesne assignments, to Kinetic Chemicals, Incorporated, Wilmington, Del., a corporation of Delaware No Drawing. Application March 24, 1931, Serial No. 525,026

28 Claims. (Cl. 260—162)

This invention relates to the production of hydrocarbons containing fluorine. It relates especially to the production of such derivatives from carbon compounds containing sulphur.

This invention has for an object the provision of novel processes for the production of carbon compounds containing fluorine. Other objects will appear hereinafter.

These objects are accomplished by the present invention whereby carbon compounds containing sulphur especially those containing one of the groups

and

are treated with inorganic fluorine compounds to produce hydrocarbons containing fluorine.

The invention will be readily understood from a consideration of the following examples wherein the parts are given by weight.

Example I

In suitable equipment provided with a water cooled reflux condenser there was agitated a mixture consisting of 450 parts of antimony trifluoride, 570 parts of antimony tri-chloride and 360 parts of carbon bisulphide. The mixture was heated to refluxing temperature and a stream of chlorine gas passed therethrough. The vapors issuing from the reflux condenser were passed through a strong sodium hydroxide scrubber and thereafter passed through a sulphuric acid scrubber, both scrubbers being held at a temperature of 25–30° C. The operation was continued until no further vapors passed through the scrubbers. The dried vapors issuing from the last scrubber were condensed by means of a suitable condenser held at a temperature of about —40° C. The product was collected in a suitable receiver at the same temperature. The product was thereafter transferred to a fractional distillation apparatus and while maintaining atmospheric pressures there was isolated di-fluoro-di-chloro-methane boiling at about —30° C. and mono-fluoro-tri-chloro-methane boiling at about +25° C.

Example II

In suitable equipment provided with a water cooled reflux condenser there was placed 610 parts of zinc fluoride and zinc fluoride and 570 parts of antimony tri-chloride. Thereafter 400 parts of carbon bisulphide was added and the mixture agitated while heating to about 55–100° C. A current of dry chlorine gas was then passed into the agitated mixture. The vapors leaving the reflux condenser were passed through a caustic scrubber and a sulphuric acid scrubber in the order named. The scrubbed vapors were condensed by passing through two condensers. The first was cooled to about 5° C. and the other to about —40° C. The first condensate was collected in a receiver maintained at 5° C. and the second condensate collected in a receiver held at —40° C. The operation was continued until no further condensate was obtained in the heated condenser. The usual time cycle for this operation has been found to be from two to five hours. The first condensate consisted largely of mono-fluoro-tri-chloro methane. The second condensate consisted mainly of di-fluoro-di-chloro methane. By fractional distillation the two products named were obtained in a pure condition.

Example III

During the course of from one to five hours, 200 parts (by weight) of hydrogen fluoride gas was passed into 750 parts of antimony penta-chloride. The equipment was provided with a water cooled reflux condenser. The resultant mass was agitated and its temperature raised to 48–60° C. and thereafter carbon bisulphide was passed into it. The addition of carbon bisulphide was continued at such a rate that the above mentioned temperature range was maintained until 300 parts of carbon bisulphide had been added. The same temperature was thereafter maintained until the condensation of the desired products ceased.

The vapors issuing from the reflux condenser were passed through a sodium hydroxide solution and then through suitable drying equipment. The vapors were condensed by means of a suitable condenser maintained at about —40° C. The condensate, which contained both mono-fluoro-tri-chloro methane, and di-fluoro-di-chloro methane, was separated into its components by fractional distillation.

Example IV

To 300 parts of antimony penta-chloride held at 50–75° C. there was continuously added anhydrous hydrogen fluoride at the rate of 20 parts per hour, chlorine at the rate of 10 parts per hour and carbon bisulphide at the rate of 35 parts per hour. Except for the additional inlet for the introduction of the hydrogen fluoride the same type of equipment as described in the previous examples was used. The vapors were removed, purified and condensed in a manner similar to that previously described.

*Example V*

A continuous stream of carbon bisulphide vapor was passed over 100 parts of anhydrous lead fluoro-chloride heated to 350–450° C. in suitable apparatus. Any unconsumed carbon bisulphide was condensed by means of a water cooled condenser. The recovered product was added (periodically or continuously as desired) to the equipment from which the carbon bisulphide was being vaporized. The remaining vapors from the above reaction were condensed in a condenser maintained at about —40° C. The operation was carried out for about 24 hours. By careful fractionation the components of both condensates and the residual carbon bisulphide were separated. These products included carbon tetra-chloride as well as fluoro-chloro derivatives of methane. The solid product remaining in the heated part of the equipment was found to have obtained a black color due to the formation of lead sulphide.

*Example VI*

One hundred (100) parts of dry lead fluoride were placed in suitable equipment provided with a water cooled condenser and a condenser cooled to about —50° C., the condensers being in series in the order named. The lead fluoride was maintained at a temperature of about 170–250° C. and over it was passed thiophosgene at a slow rate. The unconverted thiophosgene which condensed in the water cooled condenser was continuously removed and added together with fresh thiophosgene to the lead fluoride. The condensate from the condenser maintained at —40° C. was fractionally distilled and di-fluoro-di-chloro methane isolated by a fractionation which was carried out under atmospheric conditions at about —30° C.

The processes outlined in the above examples are susceptible to a great many variations and modifications. In the processes of Examples I and II other fluorides may be substituted for the antimony fluoride and the zinc fluoride listed, for instance lead fluoride, silver fluoride and other metal fluorides including those of the heavy metals may be used to an advantage. In Example I, the antimony trichloride may be omitted. In general, the fluorides of the metals of the alkali and alkaline earth groups are much less reactive than those of the heavy metals.

The products obtained by the complete or partial substitution by fluorine of the anions of inorganic penta-valent antimony compounds, for example, compositions represented empirically by $SbF_xHal_{5-x}$, where Hal represents a halogen whose atomic weight is greater than 19 (that is, greater than that of fluorine) may be used. These compositions may be conveniently prepared by the passage of hydrogen fluoride gas into an anhydrous penta-valent antimony compound, or by the action of free halogen, such as chlorine, upon antimony trifluoride with or without the presence of another antimony halide. The former procedure, carried out with antimony penta-chloride, is described in Example III. In such a process as described in Example III, chlorine gas may be run into the reaction mass during the operation if desired.

As another modification upon the process of Example III hydrogen fluoride and carbon bisulphide may be added simultaneously to the penta-valent salt. Furthermore, a continuous process may be developed from this last procedure by adding chlorine either continuously or intermittently as is described in Example IV above. When carrying out the process of Example IV if at any time the reaction should slow up it is only necessary to discontinue the addition of all of the components except the chlorine gas for about one hour in order to restore the reaction mass to a proper operating condition.

In the various procedures of Examples I, II, III and IV the proportions of the reacting components, the manner in which they are added, and the temperature of the reaction may be varied over wide ranges without serious influence upon the production of the fluorinated derivatives. Fluoro-chloro derivatives may be formed in the absence of free halogen or even in the presence of antimony tri-chloride. The presence of free chlorine, however, affords a more economic use of the penta-valent antimony compounds. The preferred temperature range for these examples is about 45–100° C. A slowing up of the reaction ordinarily results if temperatures lower than the above minimum are used. With temperatures much above the maximum above mentioned, it is necessary to use at least the greater portion of the reacting components in the vapor form.

In the process of Example V the temperature may be varied over a fairly wide range but the preferred temperature range is between about 300° C. and about 500° C. The lead fluoro-chloride may be replaced by other halogen salts of lead or by halogen salts of other heavy metals.

The halogen derivative which is formed will obviously depend upon the halogen salt of the metal used, that is to say a process analogous to this may be used to produce halogen derivatives of organic compounds which do not contain fluorine. Among the other suitable salts there may be mentioned silver fluoride and copper chloride. The reaction of Example V is promoted by the presence of iodine or chlorine or both in the carbon bisulphide.

When using the process of Example VI the thiophosgene may be in liquid or vapor form and the temperature may be varied over a wide range. At temperatures below 100° C. the reaction is somewhat slow. Higher temperatures than those specified above may be used when desired. The lead fluoride of this example may be replaced by other heavy metal fluorides as for example the fluorides of silver, antimony or zinc.

For the preparation of fluorine compounds (according to any of the examples) containing halogens other than chlorine, the corresponding halogen should be used, for instance, in the preparation of fluoro-bromo-derivatives, bromine should be used in the free and/or combined state as desired.

The expression "inorganic fluoride" as used in this application has its conventional meaning. It is to be understood therefore that it covers metal fluorides (both neutral and acid types) and hydrogen fluoride.

The sulphur compounds used as source materials in this invention are those including the atomic grouping $$-\underset{|}{C}=S$$

wherein both free bonds may be joined to the same atom or to other atoms which may be alone or a part of atomic groupings.

In some instances compounds having the grouping

for example ethyl and methyl mercaptan and tri-chloro-methyl-sulphur chloride $$(Cl_3C-S-Cl)$$

may be used satisfactorily.

As further examples of starting materials satisfactory for the practice of the invention, we may mention aralkyl compounds containing the radicals

or

in the acyclic portion thereof.

The term "heavy metal" as used herein covers those metals whose specific gravity is greater than four. This is the usual and well known designation of such metals.

It is recognized that the reactions described may be carried out in the presence of small amounts of water.

This invention has the advantage of being a direct process for the production of organic halogen compounds from sulphur compounds. A further advantage of the process is the availability of the initial compounds, particularly carbon bisulphide. The ease of preparation and availability of hydrogen fluoride and the metal fluorides is also an important advantage.

As many apparently widely different embodiments of this invention may be made without departing from the spirit and scope thereof, it is to be understood that we do not limit ourselves to the specific embodiments thereof except as defined in the appended claims.

We claim:

1. The process of preparing mixed halogen derivatives of methane containing fluorine which comprises reacting carbon bisulphide with an inorganic fluoride and antimony penta-chloride.

2. The process of preparing mixed halogen derivatives of methane containing fluorine which comprises reacting carbon bisulphide with an inorganic fluoride in the presence of an antimony chloride and added chlorine.

3. The process which comprises reacting carbon bisulphide with a mixture of a penta-valent antimony halide and a tri-valent antimony halide containing combined fluorine.

4. The process which comprises reacting carbon bisulphide with a penta-valent antimony halide containing fluorine and chlorine in the presence of a free halogen.

5. The process which comprises reacting carbon bisulphide with a penta-valent antimony halide of the type $SbF_xCl_{5-x}$, in which $x$ is a positive value less than 5.

6. The process of preparing fluoro-halo-derivatives of methane which comprises treating carbon bisulphide with a penta-valent antimony halide of the type $SbF_xCl_{5-x}$, in which $x$ is a positive value less than 5.

7. The process of preparing fluoro-chloro-derivatives of methane which comprises treating carbon bisulphide with a penta-valent antimony halide of the type $SbF_xCl_{5-x}$, in which $x$ is a positive value less than 5.

8. The process of preparing fluoro-chloro-derivatives of methane which comprises treating carbon bisulphide with a penta-valent antimony halide of the type $SbF_xCl_{5-x}$, in which $x$ is a positive value less than 5 in the presence of added chlorine.

9. The process of preparing mixed halogen derivatives of methane containing fluorine which comprises reacting carbon bisulphide with an inorganic fluoride in the presence of an antimony penta-halide.

10. The process of preparing mixed halogen derivatives of methane containing fluorine which comprises reacting carbon bisulphide with an inorganic fluoride in the presence of an antimony penta-halide and added free halogen.

11. The process of preparing mixed halogen derivatives of methane containing fluorine which comprises reacting carbon bisulphide with a heavy metal fluoride in the presence of an antimony penta-halide.

12. The process of preparing mixed halogen derivatives of methane containing fluorine which comprises reacting carbon bisulphide with a heavy metal fluoride in the presence of an antimony penta-halide and a free halogen.

13. The process of preparing mixed halogen derivatives of methane containing fluorine which comprises reacting carbon bisulphide with a heavy metal fluoride in the presence of an antimony penta-chloride and free chlorine.

14. The process of preparing mixed halogen derivatives of methane containing fluorine which comprises reacting carbon bisulphide with hydrogen fluoride in the presence of an antimony penta-halide.

15. The process of preparing mixed halogen derivatives of methane containing fluorine which comprises reacting carbon bisulphide with hydrogen fluoride in the presence of an antimony penta-halide and a free halogen.

16. The process of preparing fluoro-chloro derivatives of methane containing fluorine which comprises reacting carbon bisulphide with hydrogen fluoride in the presence of antimony penta-chloride and free chlorine.

17. In the process of producing organic fluorine compounds, the step which comprises reacting an inorganic fluoride and an antimony pentahalide containing a halogen other than fluorine with a compound composed of elements selected from the group consisting of carbon, hydrogen, sulfur and halogens whose atomic weights are greater than 19 and containing radicals selected from the group consisting of

and

said radicals not being members of a ring nucleus.

18. In the process of preparing hydrogen free fluorine derivatives of methane, the step which comprises reacting an inorganic fluoride and an antimony pentahalide containing a halogen other than fluorine with a compound composed of the radical

in combination with at least one member of the group consisting of sulfur and halogen whose atomic weights are greater than 19.

19. In the process of preparing hydrogen free fluoro-chloro derivatives of methane, the step which comprises continuously adding carbon bisulfide, chlorine and hydrogen fluoride to a pentavalent antimony halide of the type $SbF_xHal_{5-x}$ in which Hal represents a halogen whose atomic weight is greater than 19 and $x$ represents a positive value less than 5.

20. In the process of preparing hydrogen free fluoro-chloro derivatives of methane, the step which comprises continuously adding carbon bisulphide, chlorine and hydrogen fluoride to a pentavalent antimony halide of the type $Sb_xCl_{5-x}$ in which $x$ represents a positive value less than 5.

21. In the process of preparing hydrogen free fluoro-chloro derivatives of methane, the step which comprises continuously adding carbon bisulphide, chlorine and hydogen fluoride to a pentavalent antimony halide of the type $SbF_xCl_{5-x}$ in which $x$ represents a positive value less than 5.

22. The process which comprises reacting carbon bisulphide with a heavy metal fluoride and an antimony pentahalide containing a halogen other than fluorine at a temperature within the range of about 45–100° C.

23. In the process of producing organic fluorine compounds, the step which comprises reacting hydrogen fluoride and an antimony pentahalide containing a halogen other than fluorine, with a compound composed of elements selected from the group consisting of carbon, hydrogen, sulfur and halogens whose atomic weights are greater than 19 and containing radicals selected from the group consisting of

and

said radicals not being members of a ring nucleus.

24. In the process of producing fluorine derivatives of methane, the step which comprises reacting hydrogen fluoride and an antimony pentahalide containing a halogen other than fluorine with a compound composed of the radical

in combination with at least one member of the group consisting of sulfur and halogens whose atomic weights are greater than 19.

25. In the process of preparing hydrogen-free fluoro-chloro derivatives of methane, the steps which comprise the addition of hydrogen fluoride to antimony pentachloride, and the subsequent addition of carbon bisulfide.

26. The process of preparing difluoro-dichloro methane which comprises reacting carbon bisulfide with hydrogen fluoride in the presence of antimony pentachloride and free chlorine, and separating the difluoro-dichloro methane.

27. The process of preparing fluoro-trichloro methane which comprises reacting carbon bisulfide with hydrogen fluoride in the presence of antimony pentachloride and free chlorine, and separating the fluoro-trichloro methane.

28. The process of preparing mixed halogen derivatives of methane containing fluorine which comprises reacting carbon bisulfide with an antimony fluoride and a pentavalent antimony chloride.

HERBERT WILKENS DAUDT.
MORTIMER ALEXANDER YOUKER.
HAROLD LA BELLE JONES.

CERTIFICATE OF CORRECTION.

Patent No. 2,004,932. June 18, 1935.

HERBERT WILKENS DAUDT, ET AL.

It is hereby certified that error appears in the printed specification of the above numbered patent requiring correction as follows: Page 1, first column, line 52, strike out the words "and zinc fluoride"; and page 3, second column, line 71, claim 18, for "halogen" read halogens; and that the said Letters Patent should be read with these corrections therein that the same may conform to the record of the case in the Patent Office.

Signed and sealed this 23rd day of July, A. D. 1935.

(Seal)

Leslie Frazer
Acting Commissioner of Patents.